United States Patent [19]
Murata et al.

[11] Patent Number: 5,872,196
[45] Date of Patent: *Feb. 16, 1999

[54] LIQUID EPOXY RESIN COMPOSITION

[75] Inventors: Yasuyki Murata; Yoshinori Nakanishi; Norio Tohriiwa, all of Yokkaichi, Japan

[73] Assignee: Shell Oil Company, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 590,665

[22] Filed: Jan. 24, 1996

[30] Foreign Application Priority Data

Feb. 1, 1995 [JP] Japan ........................ 7-34686

[51] Int. Cl.$^6$ ..................... C08F 283/00; C08G 57/00
[52] U.S. Cl. ..................... 525/508; 525/523; 525/533; 528/100
[58] Field of Search ...................... 525/508, 523, 525/533; 528/100

[56] References Cited

U.S. PATENT DOCUMENTS 5,344,899  9/1994  Enomoto et al. ................. 525/529

FOREIGN PATENT DOCUMENTS 62-53327   9/1993   Japan .
1689391   11/1993   U.S.S.R. .

OTHER PUBLICATIONS

"Epoxy Resin and Epoxy Resin Technology," by Ronald S. Bauer.

Primary Examiner—Randy Gulakowski
Attorney, Agent, or Firm—Dennis V. Carmen

[57] ABSTRACT

The present invention relates to a liquid resin composition comprising (1) a liquid epoxy resin, (2) a particular ester curing agent, and (3) a curing accelerator. This epoxy resin composition can provide a cured resin with excellent heat resistance and water resistance, which is particularly useful for encapsulation, casting and adhesion.

8 Claims, No Drawings

LIQUID EPOXY RESIN COMPOSITION

FIELD OF THE INVENTION

The present invention relates to a novel liquid epoxy resin composition having a low viscosity which provides a cured resin having excellent heat resistance and water resistance. More specifically, it relates to a liquid epoxy resin composition which can be handled as a liquid before curing and gives a cured resin having excellent heat resistance and water resistance after curing, and relates to the composition particularly useful for encapsulation, casting, adhesion, and molding.

BACKGROUND OF THE INVENTION

Liquid epoxy resin compositions are used widely in the fields of encapsulation, casting, adhesion, and molding since they have excellent curability and ease of handling.

In recent years there have been various changes in the use requirements for liquid epoxy resins. While progress has been made on technology to improve properties, certain properties, such as heat resistance and water resistance, are still not adequate to meet certain use requirements. For example, liquid epoxy resin compositions employing standard curing agents, such as liquid acid anhydrides or amine-type compounds, do not have adequate water resistance. On the other hand, epoxy resin compositions using phenol-type compounds as curing agents provide cured resins having relatively good heat resistance, water resistance and the like, but have the defects that the resulting performances are inadequate. Moreover, since the phenol-type curing agents have very high viscosity or are solids at ordinary temperature, epoxy resin compositions using them also have high viscosity, and as a result, it is difficult to handle the compositions as liquid.

An object of the present invention is to provide a novel liquid epoxy resin composition that can be handled as liquid before curing and gives a cured resin having excellent heat resistance, water resistance, and the like after curing.

SUMMARY OF THE INVENTION

The present invention relates to a liquid epoxy resin composition comprising (a) an epoxy resin in a liquid state at ambient temperature,
(b) a curing agent for the epoxy resin, and
(c) a curing accelerator, wherein said curing agent is an ester compound having a structure represented by formula (I)

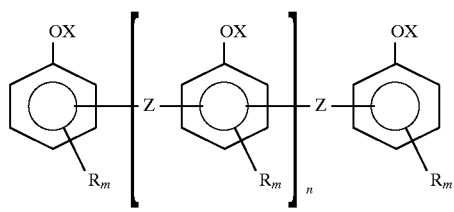

where X each may be the same or different and is a hydrogen atom or a group represented by formula (II)

wherein A is an alkyl group having 1 to 6 carbon atoms, which may be the same or different, and 50 percent or more of X in the total amount of X are the groups represented by the formula (II), R each may be the same or different and is an alkyl group having 1 to 10 carbon atoms, a substituted or unsubstituted phenyl group, a substituted or unsubstituted aralkyl group, an alkoxy group or a halogen atom, Z each may be the same or different and is a divalent hydrocarbon group having from 1 to 15 carbon atoms, n is a number of from 0 to 2 on the average value, and m each may be the same or different and is an integer of from 0 to 4.

Since both the liquid epoxy resin and the particular ester curing agents claimed herein have low viscosities, it is possible to prepare end-use compositions having a low viscosity. Further, the cured composition has excellent heat resistance and water resistance as shown in the Illustrative Embodiments. This is compared with epoxy resin cured with prior art acid anhydrides where the epoxy resin and the curing agent are bonded with ester bonds. Since these ester bonds are hydrolyzed under high temperature and high humidity, deteriorations in properties occur. Further, since an epoxy resin cured with prior art amine type curing agent contains amines having high polarity, moisture absorption and deteriorations in properties occur.

Even in the epoxy resin cured with the prior art phenol type curing agent, water resistance is not sufficient since hydroxyl groups having high polarity are contained therein. Further, since the phenol type curing agent itself has phenolic hydroxyl groups it is difficult to make the resin to be a liquid state without using a large amount of solvents or additives such as reactive diluents and the like which adversely affects physical properties.

On the other hand, an epoxy group and an ester group react and bond as shown in the reaction formula III below.

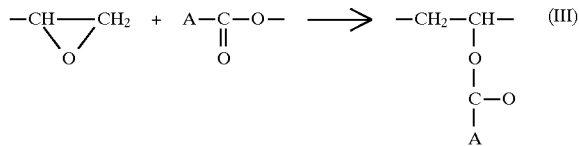

Thus, since the epoxy resin cured with the compound having ester groups as active groups contains little or no hydroxy groups, heat resistance and water resistance are excellent.

DETAILED DESCRIPTION OF THE INVENTION

The epoxy resin (a) is in a liquid state at ambient or room temperature, and is not particularly limited as long as it is an epoxy resin that can be handled as liquid at ordinary, i.e. ambient or room temperature.

Examples of the epoxy resin (a) in a liquid state at ordinary temperatures are those produced from various phenols (e.g., bisphenol A, bisphenol F, tetramethylbisphenol F, bisphenol AD, hydroquinone, methylhydroquinone, dibutylhydroquinone, resorcin, methylresorcin, dihydroxydiphenyl ether, dihydroxynaphthalene, phenol novolak resin, cresol novolak resin, bisphenol A novolak resin, dicyclopentadiene phenol resin, terpene phenol resin, phenol aralkyl resin, brominated bisphenol A, brominated phenol novolak resin) or various phenol type compounds such as polyhydric phenol resins obtained by condensation reaction between various phenols and various aldehydes (e.g. benzaldehyde, acetaldehyde, prophylaldehyde), and an epihalohydrin; liquid epoxy resins produced from various amine compounds (e.g., diaminodiphenylmethane, aminophenol, xylenediamine) and an epihalohydrin; liquid epoxy resins produced from various carboxylic acids (e.g., methylhexahydroxyphthalic acid, dimer acid) and an epihalohydrin (e.g. epichlorohydrin); and the like.

Of those, liquid epoxy resins produced from at least one phenol compound selected from bisphenol A and bisphenol F, and an epihalohydrin such as epichlorohydrin, and having a viscosity of 200 poise or less at 25° C. are preferred in view of various properties and easy availability.

Further, solid epoxy resins in a small amount may be used together, for the purpose of adjusting various properties, to the extent that the liquid epoxy resin composition after blending the solid epoxy resin can be handled as a liquid without any problem.

The curing agent (b) for an epoxy resin used in the liquid epoxy resin composition of the present invention is not particularly restricted on its structure and production method as long as it is an ester compound having a structure represented by the general formula (I) mentioned above. In general, aromatic ester compounds obtained by esterifying 50 percent or more of phenolic hydroxyl groups in various polyhydric phenol compounds represented by the formula (IV) mentioned below with various esterifying agents can be used, too.

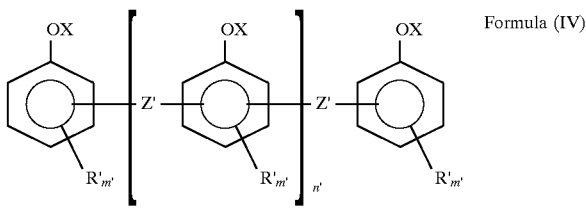

Formula (IV)

In the formula, R' each may be the same or different and is an alkyl group having 1 to 10 carbon atoms, a substituted or unsubstituted phenyl group, a substituted or unsubstituted aralkyl group, an alkoxy group or a halogen atom, Z' each may be the same or different and is a direct bond or a divalent hydrocarbon having 1 to 15 carbon atoms, n' is a number of from 0 to 2 on the average value, and m' each may be the same or different and is an integer of from 0 to 4.

Examples of the various polyhydric phenol compounds represented by the general formula (IV), which are the starting material, are various polyhydric phenols such as bisphenol A, bisphenol F, biphenol, tetramethylbiphenol, tetrabromobisphenol A, phenol novolak resin, cresol novolak resin, bisphenol A novolak resin, dicyclopentadiene phenol resin, terpene phenol resin, phenol aralkyl resin, or brominated phenol novolak resin; polyhydric phenol resins obtained by condensation reaction between various phenols and various aldehydes such as benzaldehyde, acetaldehyde or propionaldehyde; and the like. A preferred curing agent is a compound obtained by acetylating 50 percent or more of hydroxyl groups in the phenol novolak resin.

The esterification methods of the polyhydric phenol compounds include various methods, but the representative esterification method is a method of esterifying the polyhydric phenol compounds using esterifying agents represented by the general formulae (V) or (VI) mentioned below:

Formula (V)

In the formula, B is a hydrocarbon group having 1 to 6 carbon atoms, and Y is a hydroxyl group, an alkoxy group, or a halogen atom.

Formula (VI)

In the formula, B is a hydrocarbon group having 1 to 6 carbon atoms.

The esterification reaction can be conducted by various methods using various conditions according to the kinds or the combinations of the polyhydric phenol compounds and the esterifying agents which are the starting materials. The conditions and the representative method of the esterification are that both starting material components are mixed in the presence of a solvent, as a reaction medium, or in the absence of solvents, and are reacted at a temperature of from 0° to 150° C. for 1 to 10 hours in the presence of a catalyst under stirring. After completion of the reaction, the unreacted esterifying agent, by-products, solvents, and the like are removed to obtain the desired aromatic ester compounds having a low viscosity.

Examples of the reaction catalysts are amines such as trimethylamine, triethylamine, benzylmethylamine, dimethylaniline or pyridine; an alkali metal hydroxide such as sodium hydroxide or potassium hydroxide; an alkali metal alkolate such as potassium-t-butoxide or sodium ethoxide; alkyl metals such as butyl lithium or biphenyl sodium; hydrochloric acid; sulfonic acid; oxalic acid; fluoroacetic acid; toluenesulfonic acid; organic acid salts showing an acidity; fluoroboric acid; heteropolyacids; polyphosphoric acids; an acidic catalyst such as active clay; and the like.

Further, examples of the reaction solvents are inert organic solvents such as ketones (e.g., acetone, methyl ethyl ketone, methyl isobutyl ketone), aromatic hydrocarbons (e.g., benzene, toluene, xylene), ethers (e.g., dioxane, ethylene glycol dimethyl ether), or aprotic polar solvents (e.g., dimethylsulfoxide, dimethylformamide), water, and the like.

In this esterification reaction, the amount of the esterifying agent used and the reaction conditions must be selected such that 50 percent or more of phenolic hydroxyl groups in the polyhydric phenol compound, which is the starting material, are esterified. If the conversion of esterification is less than 50 percent, the effect of the present invention is not sufficiently obtained.

Those ester compounds are used alone or as mixture of two of more thereof.

Further, curing agents other than the ester compound may be used together in the liquid epoxy resin composition of the present invention, for the purpose of adjusting various properties, to the extent that no problem occurs on the handling as liquid and the curing properties of the liquid epoxy resin composition after blending such curing agents.

Examples of the curing agents other than the ester compound are various phenolic resins such as various phenols (e.g., bisphenol A, bisphenol F, bisphenol AD, hydroquinone, resorcin, methyl resorcin, biphenol, tetramethyl biphenol, dihydroxynaphthalene, dihydroxydiphenyl ether, phenol novolak resin, cresol novolak resin, bisphenol A novolak resin, naphthol novolak resin, brominated bisphenol A, brominated phenol novolak resin) or polyhydric phenol resin obtained by condensation reaction between various phenols and various aldehydes (e.g., benzaldehyde, acetaldehyde, propylaldehyde, hydroxybenzaldehyde, crotonaldehyde, glyoxal); acid anhydrides such as methyltetrahydrophthalic anhydride, hexahydrophthalic anhydride, pyromellitic dianhydride or methylnadic acid; diethylene triamine; isophorone diamine; diaminodiphenyl methane; diaminodiphenyl sulfone; dicyane diamides; and the like.

The amount of those other curing agents to be used is preferably 100 parts by weight or less, and more preferably 50 parts by weight or less per 100 parts by weight of the ester compound. If the amount of the other curing agents to be used is too large, the effect of the present invention is not sufficiently exhibited.

The amount of the curing agent for an epoxy resin to be used in the liquid epoxy resin composition of the present invention should be such that the total number of groups in all the curing agents, which are reactive to epoxy is preferably from 0.5 to 2.0 mols and more preferably from 0.7 to 1.2 mols per mole of the epoxy groups in all the epoxy resin components.

Next, the curing accelerator (c) is formulated in the liquid epoxy resin composition of the present invention. The curing accelerator is a compound that accelerates the reaction between the epoxy groups in the epoxy resin and the ester groups in the curing agent, and the reaction between the epoxy groups and the phenolic hydroxyl groups.

Examples of the curing accelerator (c) are phosphine compounds such as tributyl phosphine, triphenyl phosphine, tris(dimethoxyphenyl)phosphine, tris(hydroxypropyl) phosphine, or tris(cyanoethyl)phosphine; phosphonium salts such as tetraphenyl-phosphonium tetraphenyl borate, methyltributylphosphonium tetraphenyl borate, or methyltricyanoethylphosphonium tetraphenyl borate; imidazoles such as 2-methylimidazole, 2-phenylimidazole, 2-ethyl-4-methylimidazole, 2-undecylimidazole, 1-cyanoethyl-2-methylimidazole, 2,4-dicyano6-[2-methylimidazolyl-(1)]-ethyl-S-triazine, or 2,4-dicyano-6-[2-undecylimidazolyl-(1)]-ethyl-S-triazine; imidazolium salts such as 1-cyanoethyl-2-undecylimidazolium trimellitate, 2-methylimidazolium isocyanurate, 2-ethyl-4-methylimidazolium tetraphenyl borate, or 2-ethyl-1, 4-dimethylimidazolium tetraphenyl borate; amino compounds such as, 2,4,6-tris (dimethylaminomethy)phenol, benzylmethyl amine, tetramethylbutyl guanidine, N-methyl piperidine, or 2-methylamine-1-pyroline; ammonium salts such as tristhylammonium tetraphenyl borate; diazabicyclo compounds such as 1,5-diazabicyclo (5,4,0)-7-undecene, 1,5-diazabicyclo(4,3,0)-5-none, or 1,4-diazabicyclo(2,2,2)-octane; and their diazabicyclo compound tetraphenyl borates, phenol salts, phenol novolak salts, or 2-ethyl hexanoic acid salts; and the like.

Of those compound that are used as the curing accelerator, phosphine compounds, imidazole compounds, diazabicyclo compounds, and their salts are preferred.

Those curing accelerators (c) are used alone or as a mixture of two or more thereof, and the amount to be used is 0.1 to 7 percent by weight, and more preferably 0.5 to 3 percent by weight based on the weight of the epoxy resin (a) in a liquid state at ordinary temperature.

Similar to other general epoxy resin compositions, various additives can be formulated in the liquid epoxy resin composition of the present invention. Examples of the various additives are fillers, coupling agents, flame retardants, plasticizers, solvents, reactive diluents, pigments and the like. Those are appropriately formulated according to the needs.

Examples of the fillers are a fused silica, a crystalline silica, a glass powder, alumina, calcium carbonate, and the like. Further, examples of the flame retardants are antimony trioxide, phosphoric acid and the like. In addition, brominated epoxy resins can be used as a part of the epoxy resin to be used so as to render the composition flame retardant.

The liquid epoxy resin composition of the present invention gives a cured resin having excellent heat resistance, water resistance, and the like at a low viscosity. As a result, the liquid epoxy resin can advantageously be used for encapsulation, casting, adhesion, and molding.

ILLUSTRATIVE EMBODIMENTS

The present invention is described in more detail below with reference to the preparation examples of the curing agent (b) for the epoxy resin in a liquid state at ordinary temperature, to be used in the liquid epoxy composition of the present invention, and the examples and comparative examples of the liquid epoxy resin composition of the present invention.

A. Preparation Examples 1 to 5: Curing Agent for Epoxy Resin (Aromatic Ester Compound)

A three-necked flask having an inner volume of three liters equipped with a thermometer, a stirrer, and a condenser was charged with a phenol novolak resin, a terpene novolak resin, a cresol novolak resin or bisphenol F as a phenol compound, acetic acid anhydride or picolic acid chloride as an esterifying agent, and pyridine in the amounts shown in Table 1, and was kept at 40° C. for 2 hours to conduct the reaction.

Subsequently, 1000 grams (g) of methyl isobutyl ketone were added and completely dissolved. After removing by-product salts and the like by water washing, methyl isobutyl ketone was removed under reduced pressure to obtain the desired aromatic ester compounds.

Phenolic hydroxyl group content, ester group content and viscosity of those aromatic ester compounds ere measured. The results are shown in Table 1.

TABLE 1

| | | | Preparation Example | | | | |
|---|---|---|---|---|---|---|---|
| | | | 1 | 2 | 3 | 4 | 5 |
| Preparation Conditions of Aromatic Ester Compound | Phenol compound | Type | A | B | C | D | A |
| | | Amount used (g) | 102 | 117 | 162 | 100 | 102 |
| | Esterifying agent | Type | E | E | E | F | E |
| | | Amount used (g) | 90 | 80 | 100 | 95 | 45 |
| | Pyridine | Amount used (g) | 200 | 200 | 250 | 200 | 150 |
| Analytical Results | Phenol hydroxyl group content (meq./g) | | 0.71 | 2.05 | 0.50 | 1.89 | 5.01 |
| | Ester group content (meq./g) | | 6.39 | 4.78 | 4.51 | 4.41 | 3.34 |

TABLE 1-continued

|  | Preparation Example | | | | |
|---|---|---|---|---|---|
|  | 1 | 2 | 3 | 4 | 5 |
| Rate of Esterifying (%) | 90 | 70 | 80 | 70 | 40 |
| Viscosity, 50° C. (PS) | 108 | 230 | 353 | 2.1 | 920 |

Notes:
A: Phenol novolak resin (trade name: VR-2210; produced by Mitsui-Toatsu Chemicals, Inc., hydroxyl equivalent: 102, softening point: 60° C.)
B: Cresol novolak resin (produced by Gunei Chemicals Co., Ltd., hydroxyl equivalent: 117, softening point: 52° C.)
C: Terpene phenol resin (trade name: YP-90; produced by Yasuhara Chemicals Co., Ltd., hydroxyl equivalent: 162, softening point: 82° C.)
D: Bisphenol F
E: Acetic anhydride
F: Pivalic acid chloride B. Examples 1 to 5, and Comparative Examples 1 to 4: Liquid Epoxy Resin Composition The viscosity of those mixtures was measured and results are shown in Table 2.

TABLE 2

|  |  |  | Ex. 1 | Ex. 2 | Ex. 3 | Ex. 4 | Ex. 5 | Comp. Ex. 1 | Comp. Ex. 2 | Comp. Ex. 3 | Comp. Ex. 4 |
|---|---|---|---|---|---|---|---|---|---|---|---|
| Formulation | Liquid Epoxy Resin | Type | G | H | G | G | H | G | G | G | G |
|  |  | Amount used (g) | 100 | 100 | 100 | 100 | 100 | 100 | 100 | 100 | 100 |
|  | Curing Agent for Epoxy Resin | Type | Prep. Ex. 1 | Prep. Ex. 1 | Prep. Ex. 2 | Prep. Ex. 1 | Prep. Ex. 4 | I | J | K | Prep. Ex. 5 |
|  |  | Amount used (g) | 80 | 42 | 85 | 35 | 52 | 90 | 10 | 70 | 83 |
|  | Curing Agent for Epoxy Resin | Type | — | Prep. Ex. 4 | — | Prep. Ex. 3 | K | — | — | — | — |
|  |  | Amount used (g) | — | 36 | — | 50 | 20 | — | — | — | — |
|  | Curing Accelerator | Type | L | M | L | N | M | L | L | L | M |
|  |  | Amount used (g) | 1 | 1 | 1 | 2 | 1 | 1 | 1 | 1 | 1 |
| Viscosity of compound, 25° C. (PS) | | | 112 | 139 | 148 | 137 | 122 | 5.1 | 31 | 1000 or more | 671 |
| Curing Property | Glass transistor temperature (°C.) | | 109 | 104 | 97 | 103 | 105 | 138 | 141 | 104 | 110 |
|  | Rate of Moisture Absorption; 130° C., 100% RH (%): 24 hours | | 1.4 | 1.5 | 1.4 | 1.3 | 1.6 | 2.2 | 3.4 | 2.8 | 2.1 |
|  | 168 hours | | 1.7 | 1.8 | 1.7 | 1.5 | 2.0 | * | 3.8 | 3.0 | 2.4 |

Notes:
G: Liquid epoxy resin derived from bisphenol F (trade name: EPIKOTE 806; produced by Yuka Shell Epoxy K.K., epoxy equivalent: 167, viscosity: at 25° C., 22 PS)
H: Liquid epoxy resin derived from bisphenol A (trade name: EPIKOTE 828; produced by Yuka Shell Epoxy K.K., epoxy equivalent: 186, viscosity: at 25° C., 136 PS)
I: Methyltetrahydrophthalic anhydride
J: Dicyane diamide
K: Phenol novolak resin (trade name: VR-2210; produced by Mitsui-Toatsu Chemicals, Inc., hydroxyl equivalent: 1–2. softening point: 60° C.)
L: 2-ethyl-4-methylimidazole
M: 1,5-diazabycyclo(5,4,0)-7-undecene
N: Triphenylphosphine
*Measurement was not available because the test piece was hydrolyzed.

As shown in Table 2, bisphenol A type epoxy resin or bisphenol F type epoxy resin was used as the epoxy resin (a) in a liquid state at ordinary temperature, each of the aromatic ester compounds prepared in Preparation Examples 1 to 5 was used as the curing agent (b) for an epoxy resin, methyltetrahydrophthalic anhydride was used as the acid anhydride type curing agent, dicyane diamide was used as an amine type curing agent, or phenol novolak resin was used as a phenol type curing agent, and 2-ethyl-4-methylimidazole, 1,5-diazabicyclo(5,4,0)-7-undecene or a triphenyl phosphine was used as the curing accelerator. Each liquid epoxy resin composition was thus mixed.

Those compounds were deformed, poured into molds and cured at 180° C. for 5 hours. Glass transition temperature and the rate of moisture absorption after curing were tested. The results are shown in Table 2.

Each liquid epoxy resin composition of Examples 1 to 5 has an excellent balance of properties including viscosity, heat resistance (i.e., high glass transistion temperature), and water resistance (i.e., low rate of moisture absorption, or low rate resistance to hydrolysis) as compared with the composition of Comparative Examples 1 to 4.

What is claimed is:

1. A liquid epoxy resin composition comprising
   (a) an epoxy resin in a liquid state at ambient temperature,
   (b) a curing agent for the epoxy resin, and
   (c) a curing accelerator,
wherein said curing agent comprises an ester compound having a structure represented by formula (I)

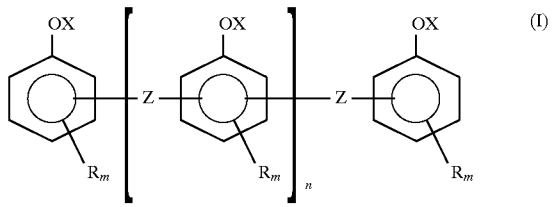

where X each may be the same or different and is a hydrogen atom or a group represented by formula (II)

wherein A is an alkyl group having 1 to 6 carbon atoms, which may be the same or different, and 50 percent or more of X in the total amount of X are the groups represented by the formula (II), R each may be the same or different and is an alkyl group having 1 to 10 carbon atoms, phenyl group, am aralkyl group, an alkoxy group or a halogen atom, Z each may be the same or different and is a divalent hydrocarbon group having from 1 to 15 carbon atoms, n is a number of from 0 to 2 on the average value, and m each may be the same or different and is an integer of from 0 to 4.

2. The liquid epoxy resin composition of claim 1 wherein said curing agent is selected from the group consisting of ester compounds obtained by esterifying phenol type compounds selected from a phenol novolak resin, a cresol novolak resin, a terpene phenol resin, bisphenol A and bisphenol F with acetic anhydride or pivalic acid.

3. The liquid epoxy resin composition of claim 2 wherein said curing agent is a compound obtained by acetylating 50 percent or more of hydroxyl groups in a phenol novolak resin.

4. The liquid epoxy resin composition of claim 1 wherein said epoxy resin has a viscosity of 200 poise or less at 25° C. and is produced from at least one phenol compound selected from bisphenol A and bisphenol F, and an epihalohydrin.

5. The liquid epoxy resin composition of claim 1 wherein said curing accelerator is selected from the group consisting of phosphine compounds, imidazole compounds, diazabicyclic compounds and their salts.

6. The liquid epoxy resin composition of claim 3 wherein said epoxy resin has a viscosity of 200 poise or less at 25° C. and is produced from bisphenol A and epichlorohydrin.

7. The liquid epoxy resin composition of claim 3 wherein said curing accelerator is an imidazole.

8. The liquid epoxy resin composition of claim 7 wherein said curing accelerator is 2-ethyl-4-methylimidazole.

* * * * *